United States Patent
Bruno

(10) Patent No.: US 7,075,805 B2
(45) Date of Patent: Jul. 11, 2006

(54) VOLTAGE CONVERTER WITH CURRENT LIMITING PORTION

(75) Inventor: Serge Bruno, Marnaz (FR)

(73) Assignee: Somfy SAS, Cluses (FR)

( * ) Notice: Subject to any disclaimer, the term of this patent is extended or adjusted under 35 U.S.C. 154(b) by 0 days.

(21) Appl. No.: 10/490,086

(22) PCT Filed: Sep. 24, 2002

(86) PCT No.: PCT/IB02/03968

§ 371 (c)(1),
(2), (4) Date: Mar. 22, 2004

(87) PCT Pub. No.: WO03/030344

PCT Pub. Date: Apr. 10, 2003

(65) Prior Publication Data

US 2004/0252527 A1   Dec. 16, 2004

(30) Foreign Application Priority Data

Oct. 2, 2001   (FR) ................... 01 12672

(51) Int. Cl.
*H02H 7/122*   (2006.01)

(52) U.S. Cl. ................ 363/56.1; 363/89; 363/86

(58) Field of Classification Search ........... 363/56.1, 363/131, 21.04, 53, 86, 89
See application file for complete search history.

(56) References Cited

U.S. PATENT DOCUMENTS

| 4,001,668 A | 1/1977 | Lewis |
| 4,422,032 A | 12/1983 | Kakumoto et al. |
| 4,641,233 A | 2/1987 | Roy |
| 4,684,871 A | 8/1987 | Plagge |
| 4,709,322 A | 11/1987 | Mirow |
| 4,731,719 A | 3/1988 | Nelson |
| 5,406,469 A | 4/1995 | Schwarz |
| 5,625,540 A | 4/1997 | Bergk |
| 5,757,628 A * | 5/1998 | Kamata .............. 363/56.1 |
| 6,061,259 A | 5/2000 | DeMichele |

FOREIGN PATENT DOCUMENTS

| EP | 0 383 382 A1 | 8/1990 |
| EP | 0 763 878 A2 | 3/1997 |
| EP | 0921 628 A1 | 6/1999 |
| EP | 0921628 | 6/1999 |
| GB | 2 203 003 A | 10/1988 |
| JP | 10098873 | 4/1998 |

* cited by examiner

*Primary Examiner*—Shawn Riley
(74) *Attorney, Agent, or Firm*—Welsh & Katz, Ltd.

(57) ABSTRACT

A voltage converter includes two input terminals, at least a current limiting portion, an electronic switch in the form of a transistor controlled by a control device in synchronization with the supply voltage, and a storage capacitor. Two output terminals taken from the storage capacitor supply the load, where the current limiting portion is formed by at least the primary of a transformer, and whose secondary output supplies a rectifier whose output terminals are connected to the load.

7 Claims, 1 Drawing Sheet

VOLTAGE CONVERTER WITH CURRENT LIMITING PORTION

FIELD OF THE INVENTION

The invention relates to a voltage converter comprising two input terminals, between which at least a current limiter, an electronic switch activated by a control device in synchronization with the supply voltage and a storage capacitor are disposed, and whose two output terminals are taken from the storage capacitor.

It thus relates to an unregulated, non-isolated converter providing an essentially constant DC voltage from an AC voltage, notably that delivered by mains at a frequency of 50 or 60 Hz.

BACKGROUND OF THE INVENTION

Similar converters are described, for example, in the following patents: EP 0 921 628, EP 0 763 878, GB 2 203 003, U.S. Pat. No. 4,001,668 and U.S. Pat. No. 4,641,233. The current limiter consists of a resistive element, in other words a resistor.

BRIEF DESCRIPTION OF THE DRAWINGS

The features of the present invention which are believed to be novel are set forth with particularity in the appended claims. The invention, together with further objects and advantages thereof, may best be understood by reference to the following description in conjunction with the accompanying drawings.

DETAILED DESCRIPTION

Figure 1:
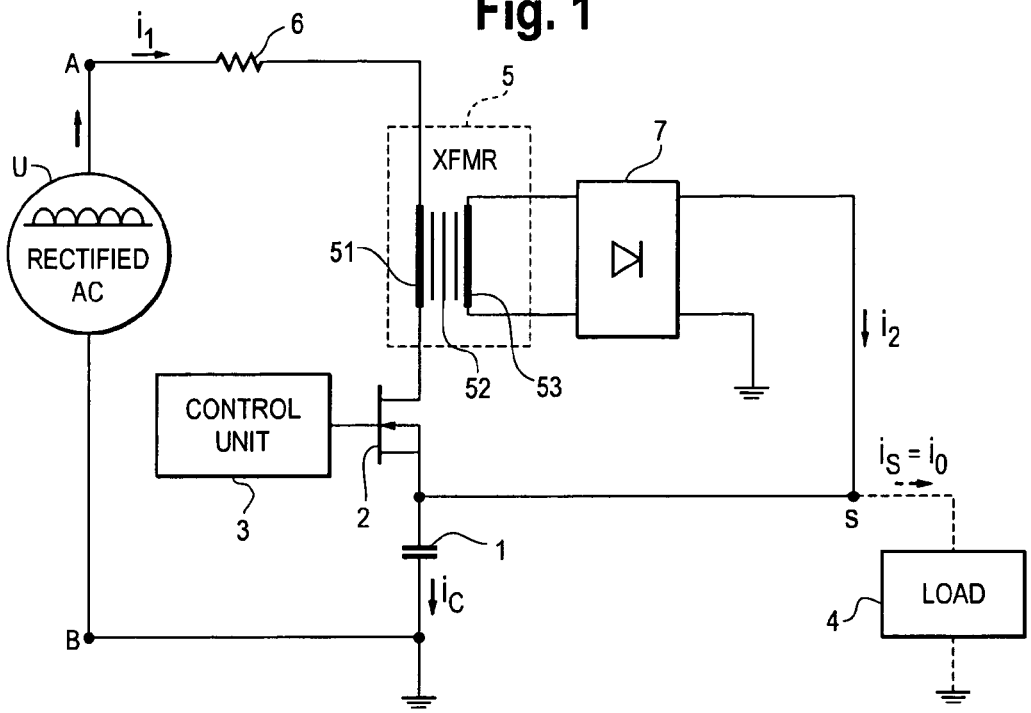
FIG. 1 is a circuit diagram of the converter according to a first embodiment.

The presence of the current limiter in series with the controlled switch and the storage capacitor is necessary since these voltage converters need to reduce the line supply voltage, for example 230 V, to a relatively low voltage, generally around 12 V. The current limiter is notably chosen so that the current flowing in the controlled switch does not exceed a permissible level during the entire period of conduction of this switch. The thermal losses within the resistor, used as a current limiter, are proportional to the square of the r.m.s. current drawn from the line by the converter. Converter efficiency is therefore very substantially improved by any reduction in this current, for a given level of useful power.

Based on this observation, the object of the invention is to effect a very significant reduction in this current.

To this end, the converter according to the invention is characterized in that the current limiter is formed by at least the primary of a transformer whose secondary supplies a rectifier whose output terminals are connected to the output terminals of the converter.

The transformer comprises at least a primary winding, a magnetic circuit and a secondary winding whose outputs are connected to the rectifier inputs, the rectifier outputs being connected in parallel with the capacitor. Due to this connection, the transformer does not require a significant galvanic isolation between the windings. It would, however, be an advantage for the transformer to have excellent coupling between the windings. According to one embodiment, the enameled wires of the primary and the secondary are wound simultaneously. This does not present a problem since even poor insulation is sufficient.

The current limiter, the switch and the capacitor can be configured in series, the voltage applied between the input terminals being a rectified alternating voltage.

The current limiter can also be connected in series with a bridge rectifier whose outputs are connected to the switch and to the capacitor, which are connected in series, the voltage applied between the input terminals being an AC voltage.

According to one embodiment, the primary and secondary windings have the same number of turns.

This not only has the effect of facilitating the simultaneous winding of the primary and the secondary, but in addition, with a transformation ratio equal to 1, the primary voltage variation cannot exceed that of the secondary voltage, which is limited by the output voltage, assumed to be low. The primary voltage of the transformer employed is therefore limited to a low level, which in turn limits the constraints on its manufacture. Therefore, the costs of mass production for such a transformer can be kept much lower than for a conventional transformer.

On this subject, it will be recalled that transformers of transformation ratio 1 are always used for the purposes of galvanic isolation between two circuits, while the converter according to the embodiments of the invention uses a transformer of ratio 1 but with poor isolation, which teaches against the usual practices of those skilled in the art.

According to another embodiment, the ratio of the number of turns between the transformer secondary and primary is less than 1, for example 0.5. In this case, if the excellent coupling between the windings is preserved, a higher voltage drop will be observed across the terminals of the primary, which will further favor a reduction in the value of the protection resistor. It is quite possible that such a choice could, in certain cases, allow the protection resistor to be eliminated, since this is only necessary when the rectified input voltage has a very large amplitude relative to the output voltage.

The transformer primary winding can be used as an inductor to filter out mains conducted interference.

The appended drawing represents, by way of examples, two embodiments of the converter according to the invention.

The voltage converter represented has two input terminals A and B to which a rectified AC voltage U, for example the line voltage, is applied. The converter comprises a storage capacitor 1 fed by an electronic switch 2, in this case an MOS transistor or a MOSFET controlled by a control unit 3 and in series with the primary 51 of a transformer 5 and a current limiting resistor 6. The control unit 3 is produced as in the prior art, for example as described in patent EP 0 921 628. It controls the opening and closing of the switch 2 via the gate of the transistor 2 whose drain is connected to the transformer primary 51 and whose source is connected to the capacitor 1, in other words to the output S of the converter.

The transformer 5 also comprises a magnetic circuit 52 and a secondary winding 53, the outputs of the secondary winding being connected to the inputs of a rectifier 7 whose outputs are connected in parallel with the capacitor 1. The converter supplies a user 4 represented symbolically.

For the following calculation and in order to simplify it, the case of a ratio of 1 between the transformer windings is considered and the winding coupling is taken as perfect. Perfect operation is also assumed in the case of the harmonics as well as in the case of the fundamental frequency of the current. The alternating component of the current $i_1$ is therefore at any instant equal to the alternating component of the transformer output current. With regard to the current $i_2$ at the output of the rectifier 7, we note that its mean value is equal to the mean value of $i_1$, but that the two are not identical.

Thus, we have:

$$<i_2> = <i_1>$$

where < > symbolizes the mean value.

In addition, we assume that the load 4 is in fact constituted by a voltage regulator supplying a resistive load and it therefore absorbs a constant current $I_0$, even if the voltage across the terminals of the capacitor 1 varies within a given range.

Thus, at any instant, we have:

$$i_c = i_1 + i_2 - I_0.$$

Thus, in terms of mean value, given that $<i_c> = 0$ and that $<i_1> = <i_2>$, we have:

$$<i_1> = I_0/2.$$

The mean value of the current $i_1$ will therefore be reduced by half in comparison with the mean value needed for a configuration according to the prior art that does not involve $i_2$.

The current $i_1$ is pulsed with an amplitude $i_{1M}$. If the conduction periods, and therefore the time variation of the current, are assumed to be identical for the configuration of the invention and for a configuration according to the prior art, then a mean value of $i_1$ reduced by half requires simply half the value for $i_{1M}$, which in turn implies that the r.m.s. value $I_1$ of $i_1$ is also halved, compared with a device according to the prior art. To a first approximation, this reduction in $i_{1M}$ is achieved by doubling the limiting resistor.

In comparison with the prior art and for the same conduction period, the device according to the invention therefore halves the thermal losses within the limiting resistor 6.

This approximate calculation does not take into account the voltage across the terminals of the transformer primary 51 which affects the calculation of the limiting resistor and which will reduce its value from the increase by a factor of two. For a loss-less transformer the gain in dissipated power is therefore in fact greater than 2.

It should moreover be noted that the limited voltage excursion of the transformer limits the maximum induction in the core, and therefore the eddy-current losses, which in itself partially justifies the assumption of a loss-less transformer.

In an embodiment where the transformer employed has a turns ratio of less than 1, for example 0.5, while at the same time preserving excellent coupling between the windings, something that is often more difficult to achieve, we will benefit from more pronounced effects. With regard to the transformer primary current, it is thus possible to achieve a ratio of 1 to 3 between a configuration according to the invention and a configuration according to the prior art and a higher voltage drop across the terminals of the primary, which will be all the more favorable to a reduction in the value of the protection resistor. This is the reason why, in certain cases, it is possible to envision the elimination of the current-limiting resistor 6 all together.

A transformer with a ratio of 0.5 and excellent coupling can be obtained by employing two primary windings and two secondary windings with the same number of turns and wound simultaneously, the two primary windings being in series while the two secondary windings are in parallel.

The detailed operation of the converter according to the invention involves the energy stored in the transformer when the switch is conducting and the energy recovered when the latter is open. However this does not add to the understanding of the invention.

Supplementary elements may be introduced into the configuration, for example between the storage capacitor and the output terminals, without however departing from the circuit claimed.

For example, starting from the rectified mains (230 V, 50 Hz) and with a mean output voltage of 11 V and a current of 100 mA in the load 4, we obtain an input r.m.s. current of 200 mA.

Figure 2:
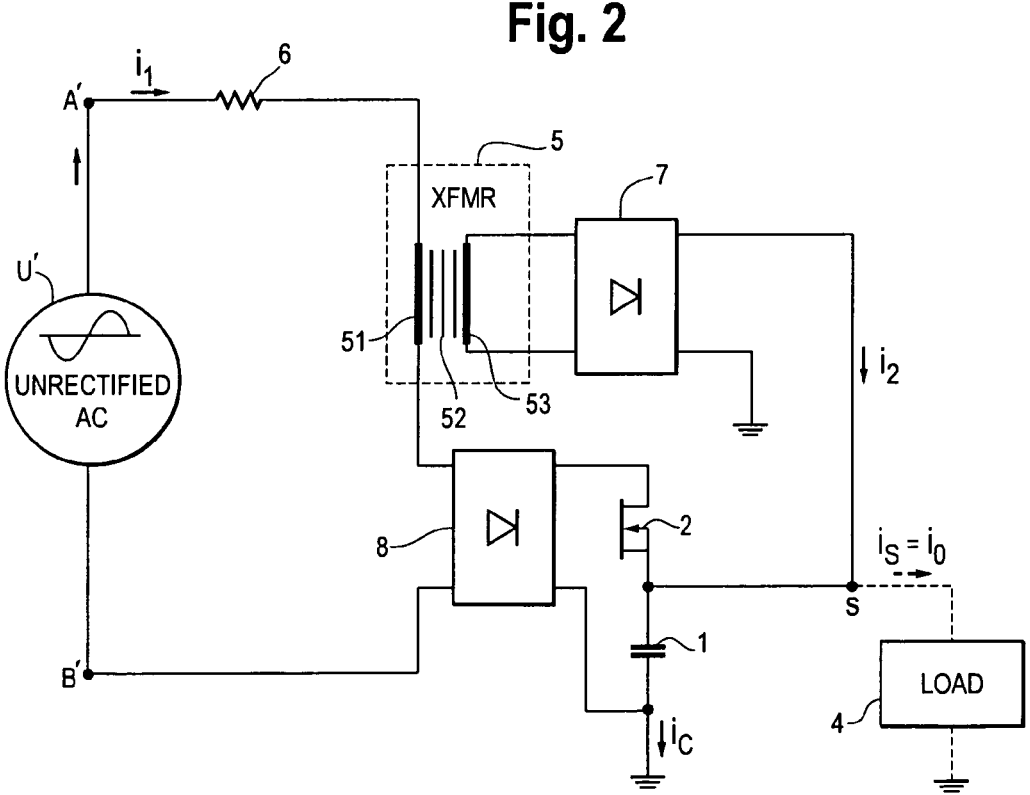
FIG. 2 is a circuit diagram of the converter according to a second embodiment.

A second embodiment of the inverter, represented in FIG. 2, differs in that the full-wave rectifier unit (diodes configured in a Graetz bridge), which was placed upstream of A and B in the previous case but was not shown in FIG. 1, is this time introduced into the series configuration in order to supply the section formed by the switch (2) and the capacitor (1). This rectifier unit bears the reference 8. Point B' is consequently not directly connected to ground.

A control unit (not shown) drives the switch 2.

The voltage U' applied between points A' and B' is now an AC voltage so that these points can now be connected directly to the mains.

With respect to the configuration of FIG. 1, this configuration has the advantage of making better use of the transformer: its primary current is now bi-directional and a complete hysteresis cycle is described during each line supply period, and the flux in the transformer magnetic circuit is able to vary between the negative and positive values of saturation flux instead of varying between the positive value of the saturation flux and the positive value of the remanent flux. The functioning of the transformer core laminations is therefore optimized, which may possibly allow them to be reduced in size.

For the other aspects, the operation is strictly identical to that described above.

It will also be noted that, since the operation of the transformer primary has become perfectly bi-directional, its primary inductance can also be used to filter out mains conducted interference, as imposed by the standards. This filtering is in fact conventionally carried out by an LC circuit.

It therefore suffices, for example, to interchange the position of the resistor 6 and the transformer primary 51 (if a specific resistor 6 is used in the circuit) so that the inductance of the winding 51 is situated upstream in the circuit, and then to follow this inductor with an additional filter capacitor C', whose other terminal is connected to point B'.

The capacitance of this filter capacitor C' is much lower than that of the storage capacitor 1: for example, values of 220 nF for the filter capacitor C' and 2200 μF for the capacitor 1 are used.

The primary winding may also be divided into two half-windings and the capacitor C' connected to the center tap of these windings. In this way, a 'T' filter configuration is produced, which is known by those skilled in the art for its superior performance. Thus, an additional advantage of the invention is therefore that it provides for good mains filtering without the need for a supplementary inductance.

Specific embodiments of a voltage converter according to the present invention have been described for the purpose of illustrating the manner in which the invention may be made and used. It should be understood that implementation of other variations and modifications of the invention and its various aspects will be apparent to those skilled in the art, and that the invention is not limited by the specific embodiments described. It is therefore contemplated to cover by the present invention any and all modifications, variations, or equivalents that fall within the true spirit and scope of the basic underlying principles disclosed and claimed herein.

The invention claimed is:

1. A direct AC to DC unregulated voltage converter or a rectified AC to DC unregulated voltage converter, comprising two input terminals between which at least a current limiter, an electronic switch controlled by a control device in synchronization with the supply voltage and a storage capacitor are disposed, and whose two output terminals are taken from the storage capacitor, wherein the current limiter is formed by at least the primary of a transformer whose secondary supplies a bridge-rectifier, whose output terminals are connected to the output terminals of the converter, the converter being connected to a main source of AC power via a full-wave rectifier when the converter is configured as a rectified AC type, and the converter being directly connected to a main source of unrectified AC power when the converter is configured as a direct AC type.

2. The converter as claimed in claim 1, wherein the primary and secondary windings have the same number of turns.

3. The converter as claimed in claim 1, wherein the ratio of the number of turns in the secondary to the number of turns in the primary of the transformer is less than 1.

4. The converter as claimed in claim 1, wherein the current limiter also comprises a resistor in series with the transformer primary winding.

5. The converter as claimed in claim 1, wherein the wires of the primary and secondary transformer windings are wound simultaneously.

6. The converter as claimed in claim 1, wherein the primary winding of the transformer is used as an inductor to filter out mains conducted interference.

7. The converter as claimed in claim 1, wherein a core of the transformer is laminated.

* * * * *